United States Patent [19]

Straubel et al.

[11] 4,132,206
[45] Jan. 2, 1979

[54] CENTRIFUGAL FORCE SPEED GOVERNOR FOR INTERNAL COMBUSTION ENGINES WITH FUEL INJECTION

[75] Inventors: Max Straubel; Ernst Ritter, both of Stuttgart; Sieghart Maier; Werner Lehmann, both of Gerlingen, all of Fed. Rep. of Germany

[73] Assignee: Robert Bosch GmbH, Stuttgart, Fed. Rep. of Germany

[21] Appl. No.: 784,741

[22] Filed: Apr. 5, 1977

[30] Foreign Application Priority Data

Apr. 13, 1976 [DE] Fed. Rep. of Germany ....... 2616283
Feb. 11, 1977 [DE] Fed. Rep. of Germany ....... 2705707

[51] Int. Cl.$^2$ .............................................. F02D 1/04
[52] U.S. Cl. .................................................. 123/140 R
[58] Field of Search ..................................... 123/140 R

[56] References Cited

U.S. PATENT DOCUMENTS

| 2,096,203 | 10/1937 | Schnürle et al. | 123/140 R |
| 3,620,199 | 11/1971 | Kuhn et al. | 123/140 R |
| 3,672,343 | 6/1972 | Biechl et al. | 123/140 R |
| 3,884,206 | 5/1975 | Ritter | 123/140 R |
| 3,895,619 | 7/1975 | Potter | 123/140 R |
| 3,903,860 | 9/1975 | Maier | 123/140 R |
| 3,924,594 | 12/1975 | Aoki | 123/140 R |
| 4,000,728 | 1/1977 | Kurokawa | 123/140 R |

Primary Examiner—Charles J. Myhre
Assistant Examiner—Andrew M. Dolinar
Attorney, Agent, or Firm—Edwin E. Greigg

[57] ABSTRACT

A centrifugal force speed governor for fuel injected internal combustion engines having at least a negative adjustment capability. In such a centrifugal force speed governor the following structural components are included: speed responsive structure; at least one adaptation spring; an adjustment member; an intermediate lever; a yield support; a control element; a stop; an energy storing structure; and a setting lever having a pin mounted thereto. The adjustment member is coupled to the speed responsive structure, the adaptation spring, the control element and through the control element to the yield support, while the setting lever engages, with its pin, the intermediate lever, the control element and the energy storing structure. When the adjustment member is displaced by the speed responsive structure and under the regulation of the adaptation spring, a displacement of the intermediate lever via the control element and the setting lever pin occurs. This displacement of the intermediate lever is transferred to a fuel supply rate adjustment member of a fuel injection pump to which the intermediate lever is coupled, producing a negative adjustment of the fuel supply rate adjustment member, i.e., an adjustment which is in the direction of increasing fuel supply as the angular speed of the governor increases.

26 Claims, 9 Drawing Figures

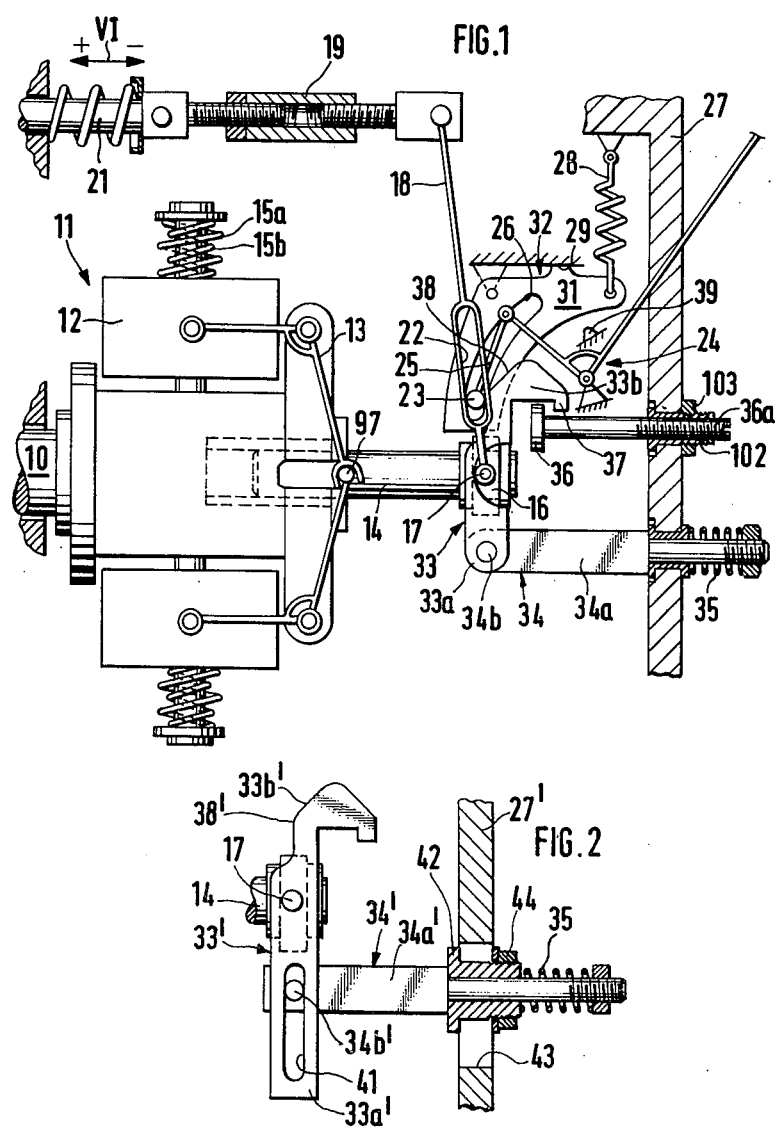

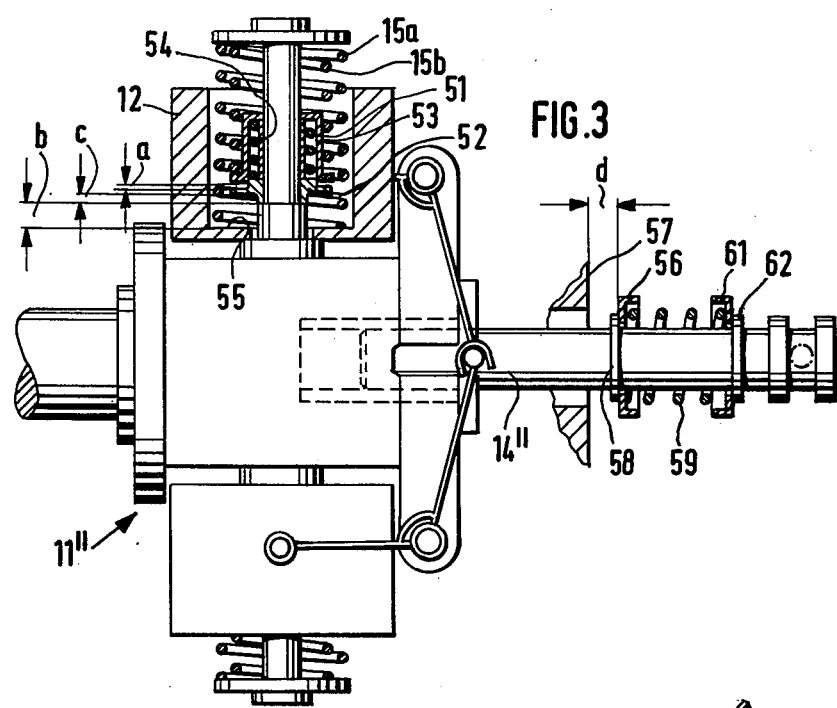
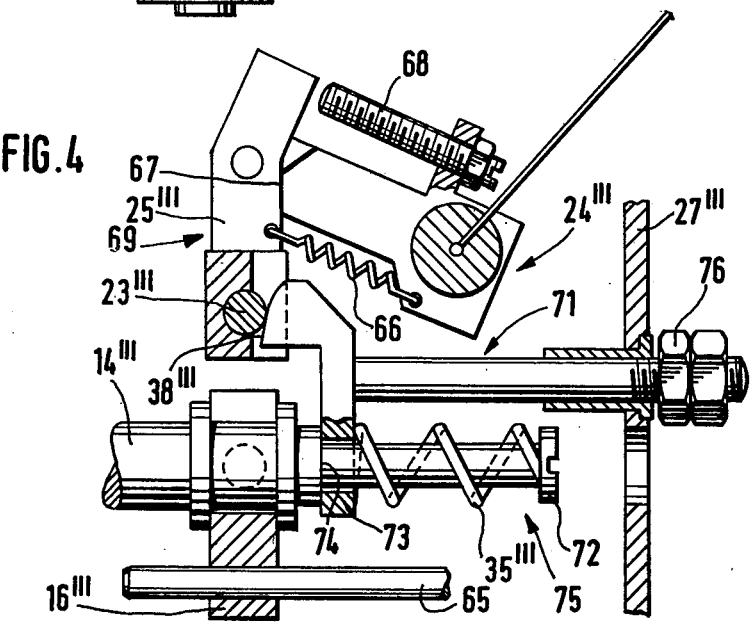

CENTRIFUGAL FORCE SPEED GOVERNOR FOR INTERNAL COMBUSTION ENGINES WITH FUEL INJECTION

BACKGROUND OF THE INVENTION

The invention relates to a centrifugal force speed governor for internal combustion engines with fuel injection, and in particular to idle and maximum speed governors having at least a negative adjustment capability.

Centrifugal force speed governors are known, see for example German Offenlugungsschrift (laid-open patent application) 2,308,260, wherein a lever-like control element pivoted to an adjusting member and forming part of a spring-and-lever controlled adapting device is capable of controlling a fuel supply rate changing in the opposite direction of regulation; that is, the fuel supply rate adjusting member is displaced in the direction of increasing fuel supply when the angular speed increases, in order to achieve a so-called negative adjustment. Because the lever-like control element in its role as a transmission member from the adjustment member to an intermediate lever is directly linked to both parts, its adaptation motion controlled by adaptation springs for a full-load adaptation is maintained even when the position of a linkage member, serving as a setting member, is altered; that is, for partial load. This is undesirable in many engines, with the reduced fuel supply rate controlled by negative adjustment at low angular speeds possibly causing unstable engine operation. The described adaptation is used in particular to so alter the maximum fuel rate supply adjusted for full-load operation over the largest possible range of angular speeds so as to correspond to the fuel supply required by the engine. It is used furthermore for smoke-free combustion, or for a particular application (loaded engine), or so as to be very close to such states.

Also, the fuel supply rate for modern fuel injection engines is increasingly affected by more stringent regulations regarding the exhaust gases. Again, the increase in fuel supply with increasing angular speed determined by the negative adjustment results in improved engine acceleration. Many engines also require a positive as well as a negative adjustment, that is, the adaptation system first controls an increasing or constant for increasing the fuel supply for a given range of angular speed when the angular speed increases, then the fuel supply drops as the angular speed increases further. Such adaptation behavior may also be implemented by means of the governor of the state-of-the-art, although with the drawbacks already stated.

OBJECTS AND SUMMARY OF THE INVENTION

The invention has as one of its objects to avoid the drawbacks of the known speed governors and to provide a centrifugal force speed governor of a design including simple means comprising an adaptation system which will allow negative adjustment, and if needed, additionally positive adjustment; and furthermore to provide for reducing the negative adjustment in the range of partial loads, or eliminating it, or reversing it into a positive adjustment.

This object is achieved by the invention in that a centrifugal force speed governor is provided in which a control element forces a pin of a linkage member into a negative adjustment position which is in the direction of increased fuel supply, when a governor sleeve traverses an adaptation displacement as controlled by an adaptation spring, at least from a full-load position of the governor sleeve. In addition, the centrifugal force speed governor includes a yield member which allows further control motions of the governor sleeve.

It is particularly advantageous, according to the invention, to provide a pressure surface on the control lever, mounted and shaped so that it may act on the pin of the linkage member when the latter is in a full-load position to control the negative adjustment, without affecting, however, the position of the pin for the case of idle and further not affecting it, or if so only by a predetermined amount, for the case of partial-load. It is therefore possible to eliminate the negative adjustment determined for the full-load position of this linkage member when operating in idle and to so correct it by the driver when in the partial-load settings, that is negative adjustment will be eliminated, reduced or reversed in its direction to positive adjustment.

It is easy and economical to convert known, mass produced centrifugal force speed governors controlling only positive adjustment into one according to the invention, provided a pivotable lever coupled to an adjustment member is used as the control linkage, with the pivotable lever being provided with a pivot support connected at one of the levers ends with the governor housing, and with the support preferably being elastically mounted in the housing and at the same time serving as a yield member. The construction of the governor comprising the flyweights is not significant, no more being required than the adjustment member carrying out an adaptation displacement.

It is another object of the invention to provide a "rest" between and positive adjustments by simple means, with the "rest" setting be accomplished without requiring access into the governor.

This object is achieved by a yielding member, equipped with a yield spring, which is disposed outside of the flyweight governor. In this manner the governor by means of its adaptation spring controls both the stroke of the control linkage regulating the negative adjustments, the rest, and the following stroke for the positive adjustment. This system therefore requires only one spring for adaptation, and provides the particular advantage that the second yield member is supported as a clutch sleeve on the adjustment member, its displacement being determined by a stop fastened to the setting linkage, with the stroke of the control linkage regulating the index stop being determined and set without entering the governor.

BRIEF DESCRIPTION OF THE DRAWINGS

The drawings illustrate in a simplified manner four embodiments of the centrifugal force governor of the invention, which are described more fully in the detailed description that follows. Briefly:

FIG. 1 is a sectional view through a first embodiment of the invention illustrating essential elements of the governor;

FIG. 2 is a partial view of FIG. 1 illustrating a variation of the pivotable lever acting as a control linkage and of the associated pivot support;

FIG. 3 is a partial sectional view through a second embodiment of the invention;

FIG. 4 is a partial sectional view through a partly illustrated third embodiment of the invention;

DESCRIPTION OF THE PREFERRED EMBODIMENTS

Figure 5:
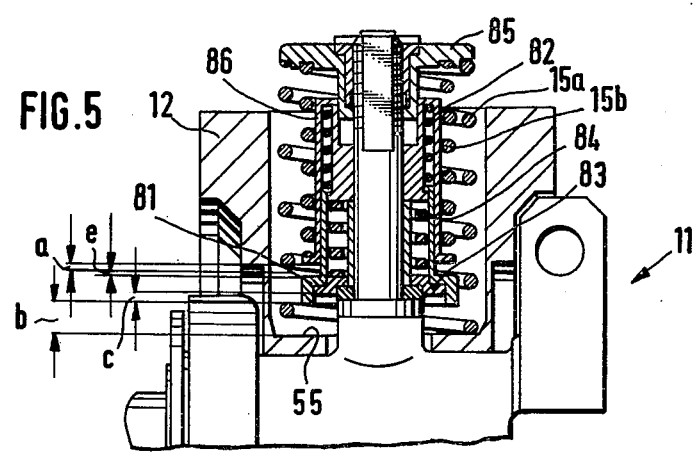
FIG. 5 is a partial sectional view through the governor of the first embodiment of the invention as illustrated in FIG. 1.

Referring to the centrifugal force speed governor of FIG. 1, a centrifugal governor 11 is mounted to a drive shaft 10 of an internal combustion engine fuel injection pump, not otherwise shown. The centrifugal governor includes flyweights 12 which act upon a governor sleeve 14 by means of angle lever 13. The governor sleeve 14 serves as an adjustment member, with the adjustment motion induced by the flyweights 12 against the opposing force of control springs 15a and 15b being transmitted by means of a pin 17, laterally mounted to a slide member 16, to an intermediate lever 18. A pin 97 connects the angle lever 13 and the governor sleeve 14.

The assembly of the centrifugal governor 11 controlling the regulating motions of the governor sleeve 14 is discussed further below.

Intermediate lever 18, configured in a known manner as a slotted lever, connects the governor sleeve 14 by means of a lengthwise adjustable connecting strap 19 with a control rod 21. The control rod 21 serves as the fuel supply rate adjusting member. A pin 23 of a setting linkage 24 penetrates a guide slot 22 of the intermediate lever 18, and serves to define an axis of rotation for the intermediate lever 18 when the setting linkage 24 is fixed. The pin 23 is mounted on a coupling link 25 of the setting linkage 24, and with one end projects into the guide slot 22 while with the other end projects into a cam-slot 26 of a cam 31. The cam 31 is pivotably supported in the governor housing 27 and is biased into a rest position by the force of a spring 28. In its rest position, a stop 29 engages the governor housing 27. The cam 31 and the spring 28 form an energy-storing device 32. The energy-storing device 32 allows the pin 23 to move so as to obtain an increase in the fuel supply rate. This motion is described below by reference to a control element 33.

The control element 33 is designed as a pivotable lever loosely coupled by means of bolt 17 with the governor sleeve 14. It is pivotably supported at its one end 33a by a joint pin 34b of a pivot support 34. The pivot support 34 is provided with a bolt-like part 34a supported parallel to the governor sleeve 14 in the governor housing 27. The bolt-like part 34a may be displaced against the force of a compression spring 35 in the same direction as the governor sleeve adjustment member 14, and thus, acts as a yield member allowing displacements of the governor sleeve 14 for regulating the motion of the control element 33, which in turn is limited by a stop 36, to achieve negative adjustment.

The stop 36 is fastened to the governor housing 27 by means of a threaded segment 36a and an adjustment bushing 102. The set position of the stop 36 is secured by a lock nut 103, which engages the bushing 102 as shown. The stop 36 can be adjusted by rotating the threaded segment 36a relative to the adjustment bushing 102. The stop 36 acts as a limit with respect to excursions of a stop dog 37 of the control element 33.

The control element or lever 33 includes at its end a compression arm 33b which defines a curved pressure surface 38. The curved pressure surface 38 faces the pin 23 and acts in concert therewith. The curved pressure surface 38 is so shaped that for the full-load position of the setting linkage 24 shown in FIG. 1, it can act on the pin 23 of the setting linkage 24 to control the negative adjustment, that is, in the sense of increasing the supply rate when the angular speed is increasing. The position of the pin 23 is unchanged when the setting linkage 24 is in the idle position, and if it is changed at all in the various partial-load positions between idle and full-load, then it is changed by a precisely predetermined amount. The shape of the pressure surface 38 and the mechanical advantage of the control lever 33 determine the magnitude and the direction of the relative motion of the pin 23 with respect to the axis of rotation of the setting linkage 24 that is transmitted from the intermediate lever 18 to the control rod 21 and regulated by the governor sleeve 14. As previously noted, the described relative motions of the pin 23 are made possible by the energy-storing device 32. The maximum excursion of the cam plate 31 of the energy-storing device 32 against the force of the spring 28 is limited by a stop 39. The stop 39 is so set as to prevent an undesired motion of the pin 23 beyond the position controlled by the control lever 33 and limited by the stop 36. Satisfactory operation of the energy-storing device 32 and the pivot support 34, acting as a bypass member, is insured only if the bias loading of the spring 28 reaching the pin 23 is less than the corresponding force of the compression spring 35.

That part of the pressure surface 38 adjacent to the pin 23 when the setting linkage 24 is in its full-load position is of such a shape that after the stop dog 37 rests against the stop 36, after a motion of the governor sleeve 14, regulated by the flyweights 12 and made possible by the compression spring 35, and upon rotation of the control lever 33 about the temporarily fixed axis of the stop 36, there can no longer be a motion of the pin 23 controlled by the pressure surface 38. In special cases it might nevertheless be desirable to so shape the pressure surface 38 that the pin 23 can be displaced by a precisely determined amount in the course of the described motion of the control lever 33.

Whereas the control lever 33 supported at a fixed distance from the governor sleeve 14 by the joint pin 34b is merely dragged along by the pin 17 of the governor sleeve 14 as shown in the first embodiment of FIG. 1, a control lever 33' is shown in FIG. 2 as a variation of the first embodiment in FIG. 1. In this variation the fixed axis of rotation is the pin 17 of the governor sleeve 14. The control lever 33' includes an end 33a' containing a longitudinal slot 41 penetrated by a joint pin 34b'. The joint pin 34b' forms part of a pivot support 34' which acts as a yield member. The joint pin 34b' acts as a pivot point for the motions described below by the control lever 33'. Pivoting support 34' rests pivotably with its bolt-like part 34a' in a support sleeve 42 and displaceably against the force of a compression draw spring 35. The support sleeve 42 may be displaced within a lengthwise slot 43 of the governor housing 27' for the purpose of modifying the spacing between the pivot support 34' and the governor sleeve 14 and is secured in the particularly set position by a nut 44 screwed on the support sleeve 42. This change in position allows modifying the mechanical advantage of the pivotable control lever 33′, whereby, in addition to controlling the position of the stop 36 utilizing the shaft of the pressure surface 38 and the fine control of the control springs for determining the settings of the adaptation regulated by the governor, it is also feasible to correct the adaptation of the fuel injection rate as given by the control lever 33′.

The second embodiment shown in FIG. 3 differs from the embodiment of FIG. 1 by a different arrangement of the control springs. Thus in the centrifugal governor 11 of the first embodiment (FIG. 1), control springs 15a and 15b and an adaptation spring, not further shown, are mounted in a known manner within flyweight 12. Such a centrifugal governor is used, for example, in the "RQ with adaptation" type idle and maximum speed governors made by the firm of Robert Bosch GmbH, Stuttgart, Germany, to whom the present application is assigned. The arrangement of the springs and spring guides within flyweight 12 of the centrifugal governor 11″ shown in the second embodiment of FIG. 3 corresponds to the Bosch RQ governors, neglecting different spacings and dimensions. An idle control spring 15a, a maximum speed governor control spring 15b and an adaptation spring 51 for regulating a positive adaptation are mounted inside the flyweights 12 of centrifugal governor 11″. Adaptation spring 51 is clamped between two spring guides 52 and 53 which are so incorporated by a sleeve 54 in the initial state shown that spring guide 52 is a distance a from the spring guide 53 for the purpose of regulating the adaptation path for positive adjustment. The distance of the spring guide 52 to the bottom 55 within the flyweight 12 consists of the spacings b and c.

The spacing b denotes the idle stroke of the flyweight 12 corresponding to the idle stroke d of governor sleeve 14″ which is determined by the separation of a spring guide 56 and a stop 57 fastened to the housing. Spring guide 56 rests on a ring 58 mounted to the governor sleeve 14″ and is loaded by an adaptation spring 59 serving to regulate negative adjustment. Also provided is a second bearing in the form of a spring guide 61 resting in the manner of the spring guide 56 by means of a ring 62 on the governor sleeve 14″. This arrangement of the invention with an adaptation spring 59 for the governor sleeve 14″ outside the flyweights 12 allows easier accessibility when setting those springs, and if there is a second adaptation spring 51 for positive adjustment within the flyweight 12, this known and proven arrangement of the spring guides and control springs may be kept, with no incorporation difficulties resulting. Upon completion of the idle stroke d of the governor sleeve 14″ solely controlled by idle control spring 15a, adaptation spring 59 in addition to idle control spring 15a acts to control the negative adjustment of the invention and further described below as regards operation during the adaptation displacement c of flyweight 12. Upon base 55 of flyweight 12 touching the spring guide 52, the adaptation path a may be used to regulate another displacement of the governor sleeve 14″ for the purpose of another adaptation, preferably positive.

The third embodiment shown in FIG. 4 is provided in the same manner as the first embodiment of FIG. 1 with a slide member 16‴ guided on the governor sleeve 14‴, which is guided in a sliding manner by a pin 65 mounted in the housing and not further shown, for the purpose of improving the guidance and preventing tilting or twisting. Setting linkage 24‴ differs from setting linkage 24 of FIG. 1 in that linkage part 25‴ carrying pin 23‴ is drawn by a spring 66 against a stop 67 and allows a larger pivoting motion of the linkage part, increasing the spacing between the pin 23‴ and the axis of rotation of the linkage member 24‴, with the larger pivoting motion being bounded by a stop 68 at a correspondingly wider position, whereby the lever system provided with the spring 66 acts as an energy storage device 69.

A slide member 71 acts as the control member; it is guided parallel to the axis of the governor sleeve 14‴ and displaceable in the same direction with the latter within the governor housing 27‴. Like control lever 33 of the first embodiment, this slide member 71 is provided with a pressure surface 38‴ which for the shown full-load position of the linkage member 24‴ and upon completion of an idle stroke of the governor sleeve 14‴ rests against the pin 23‴. The slide member 71 is kept in the position shown by a yield spring 35‴ resting on one hand on an arm 73 of the slide member 71 and on the other hand on a bolt 72 of governor sleeve 14‴, and in the position shown, it is forced by its arm 73 against a shoulder 74 of the governor sleeve 14‴. The bolt 72 and yielding spring 35‴ act as a yield member 75. Spring 35‴ is prestressed more with respect to pin 23‴ than spring 66 of energy storage 69, so that upon completion of the adaptation distance by the governor sleeve 14‴, pressure surface 38‴ forces pin 23‴ into a portion increasing the injection rate until the slide member 71 rests against the governor housing 27‴ by means of a stop-nut 76 acting as a limit stop. Further control motions of the governor sleeve 14‴ are made possible by yield spring 35‴ of yield member 75. The remaining components correspond to those of the first embodiment shown in FIG. 1 and hence are omitted from FIG. 4.

Figure 6:
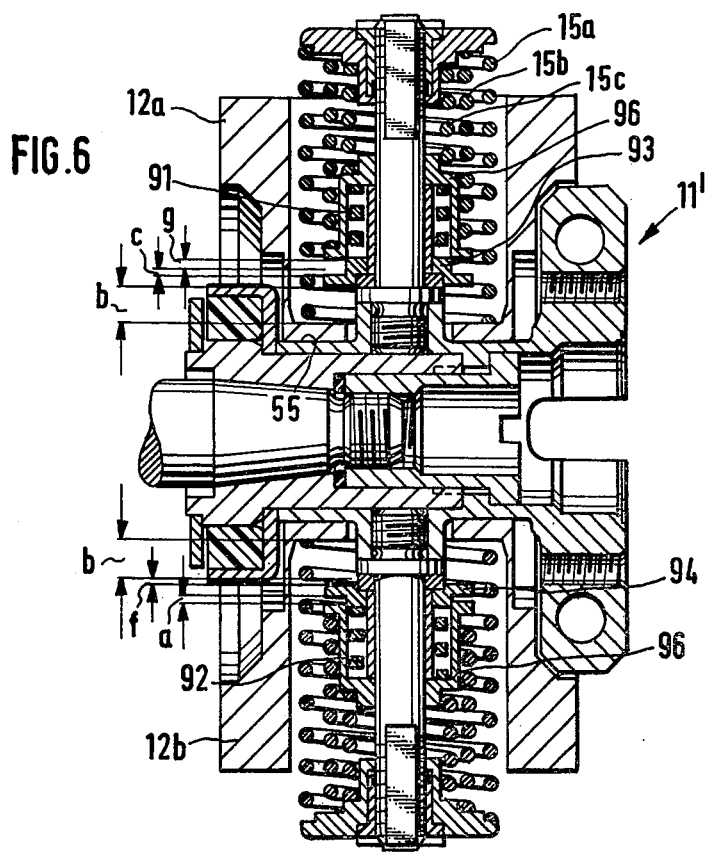
FIG. 6 is a sectional view of a modified embodiment, according to the invention, of the governor of FIG. 5.

FIGS. 5 and 6 show two variations of the first embodiment's centrifugal governor 11 (FIG. 1). The centrifugal governor of FIG. 5 holds within flyweight 12 a first adaptation spring 82 acting in concert with a spring guide 81 and a second adaptation spring 84 resting on a spring guide 83. Idle spring 15a and the maximum speed control spring 15b are, as is known, clamped between an external spring guide 85 and base 55 of flyweight 12 or a spring guide 86. The three spring guides 83, 85 and 86 are coaxial and axially offset from each other in such manner that the available space inside flyweight 12 is put to optimum use. Similar to FIG. 3, a denotes the adaptation path for positive adjustment, b the idle stroke of flyweight 12 and c the adaptation path for negative adjustment. An idle stroke in the space between spring guides 81 and 86 is denoted by e, corresponding to adaptation path c.

As regards the centrifugal governor 11′ of FIG. 6, the springs and spring guides provided inside flyweights 12a and 12b are mounted similarly to those in the known centrifugal governors of the Bosch RQ type, except for the spacings and dimensions. According to the invention, however, flyweight 12a holds a first adaptation spring 91 for negative adjustment, while the opposite flyweight 12b contains a second adaptation spring 92 for positive adjustment. As is the case for centrifugal governor 11, the centrifugal governor 11′ holds an idle spring 15a and a maximum speed spring 15b supplemented by a second spring 15c reinforcing the latter. A spring guide 93 operating in concert with adaptation spring 91 is mounted in such manner that the base 55 of flyweight 12a touches the guide after passing through the idle path b. Then this spring guide 93 retraces the adaptation path c to control negative adjustment, which path corresponds to an idle stroke f in the second flyweight. If flyweight 12b upon traversing the idle stroke f corresponding to the adaptation path c rests on a spring guide 94 operating in concert with adaptation spring 92, then upon a corresponding increase in angular speed and centrifugal force, the spring guide 94 may yield before the force of adaptation spring 92 and will move through the adaptation control path a for positive adjustment. The adaptation path a of flyweight 12b or of spring guide 94 corresponds in flyweight 12a to a stroke by spring guide 93 denoted with g. After both control paths c and a have been traversed, both spring guides 93 and 94 rest against a sleeve-like spring guide 96 which is loaded by maximum speed control springs 15b for the purpose of controlling the maximum angular speed. Both flyweights 12a and 12b are linked in a known manner and as shown in FIG. 1 by means of angle levers 13 to the pin 97 in FIG. 1, which acts as a common linkage point on the governor sleeve 14. The described arrangement of the two adaptation springs 91 and 92 in each of the flyweights 12a and 12b offers the advantage of the governor requiring fewer springs and in the possibility of housing larger and stronger adaptation springs in the available space.

Figure 7:
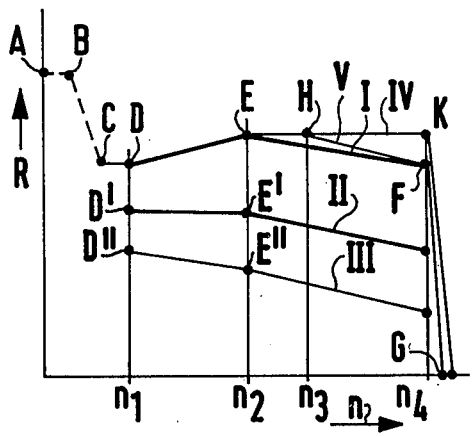
FIG. 7 is a graph of the control curves which can be obtained by means of the three embodiments in FIGS. 1–6.

FIG. 7 shows the various control curves made possible by the centrifugal force governors of the invention per FIGS. 1 through 6. The abscissa for these curves designates the angular speed, n (pump rpm), and the ordinate designates the position R of control rod 21. The dashed line A-B-C shows the control path sequence in the lower range of angular speeds when the governor controls an excess of fuel required for starting, the excess amount being for instance reduced to control path C by idle control spring 15a. The solid line D-E-F drawn between angular speeds $n_1$ and $n_4$ is denoted by I and shows an adaptation curve with a negative adjustment controlled between points D and E by the centrifugal speed governor at first, and subsequently a positive adjustment between E and F. II and III are two adaptation curves when the setting linkage 24 is in the partial-load position, showing that the full-load controlled negative adjustment between D and E reverses into positive adjustment between points D" and E" of curve III. As shown by curve II, a horizontal curve may be controlled between D' and E' between angular speeds $n_1$ and $n_2$ in a transition range. The adaptation curves denoted by I through IV may be controlled by a single adaptation spring, but then the slope of segment E-F no longer is independently selectable from that of segment D-E.

If only a negative adjustment D-E is desired, the control rod remains, above angular speed $n_2$, at the position assumed for $n_2$. Adaptation then takes place in accordance with curve IV between points D-E-K.

A freely selectable positive adjustment with a horizontal curve between angular speeds $n_2$ and $n_3$ is represented by line V through D-E-H-F. Such an adaptation curve may be controlled by the governors of FIGS. 3, 5 and 6 provided with two adaptation springs.

Figure 8:
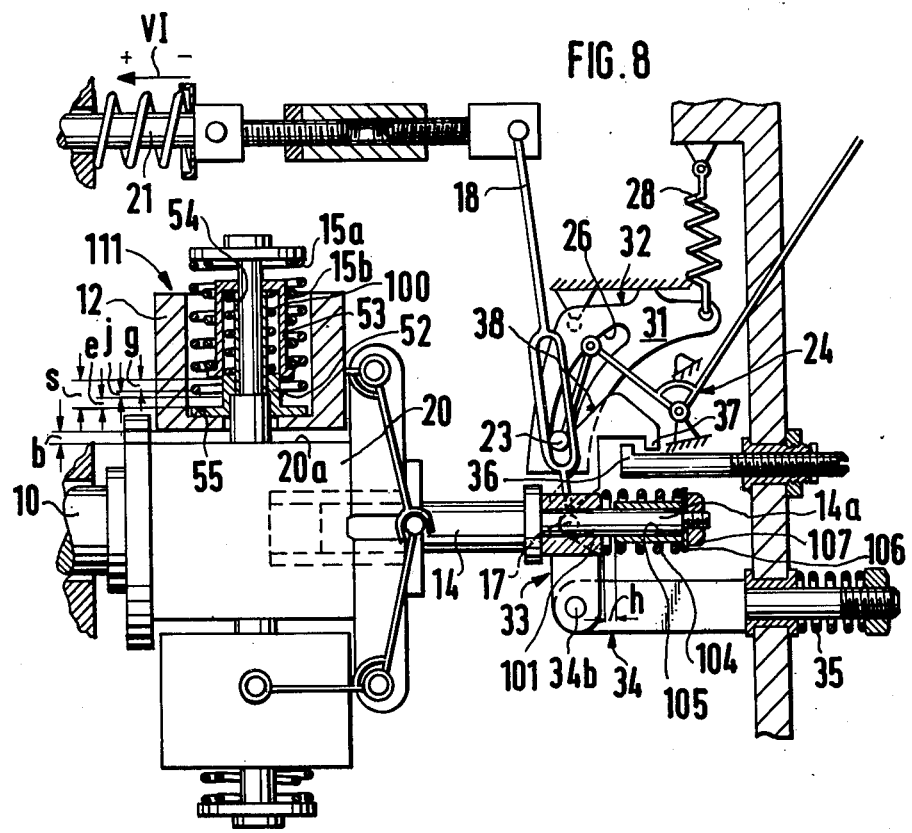
FIG. 8 is a longitudinal sectional view through a fourth embodiment of the invention.

The embodiment illustrated in FIG. 8 essentially differs from that of FIG. 1 by a clutch sleeve 101 replacing the slide member 16 of FIG. 1. The clutch sleeve 101 rests on the governor sleeve 14, and is designed as a second yield member. The arrangement of the springs and spring guides within flyweight 12 of the centrifugal governor, denoted here by the reference numeral 111, corresponds to the arrangement described in FIG. 3, except for different spacings and dimensions.

The idle control spring 15a, the maximum speed control spring 15b and an adaptation spring 100 for controlling both negative and positive adjustments are mounted inside flyweights 12 of centrifugal governor 111 in a manner known per se. The spring 100 also determines a rest position between negative and positive adjustments, where, as described in further detail below, no adaptation takes place within a predetermined range of angular speeds. Adaptation spring 100 is clamped between two spring guides 52 and 53 which are so integrated by means of a sleeve 54 shown in the initial position that spring guide 52 is provided with a spacing s with respect to spring guide 53 for the purpose of allowing an adaptation control path for the entire adaptation. The spacing between flyweight 12 and a support surface 20a for flyweight 12 at the flyweight carrier 20 is denoted as the idle stage b; in the position shown, flyweight 12 already has traversed its idle stroke. Therefore the spacing between spring guide 52 and base 55 within flyweight 12 has become zero.

Adaptation control path s is divided into three partial control paths e, j and g. Partial control path e is used for negative adjustment controlled by control lever 33 until this lever comes to rest against the stop 36, partial control path j is traversed by spring guide 52 and hence by flyweight 12 and governor sleeve 14, while clutch sleeve 101, acting as a second yield member, maintains its position thanks to yield spring 104 and is kept in place by control lever 33, whereby intermediate lever 18 and therefore control rod 21 also remain fixed.

This immobility of the clutch sleeve 101 terminates once a space denoted by h between the clutch sleeve 101 and a sleeve-like stop component 105 supported on the governor sleeve 14 in the manner of the clutch sleeve has been traversed. Thereafter the connection between the governor sleeve 14 and the clutch sleeve 101 is rigid and the crossing of the partial control path g results in a positive adjustment known per se with corresponding reduction in the fuel supply. The pin 23 then acts as a temporary axis of rotation for the intermediate lever 18. The stop component 105 and the yield spring 104 rest on a plate 106 held by a nut 107 on a horizontal extension 14a of the governor sleeve 14.

A satisfactory mode of the adaptation control motions is ensured when the prestressing of the yield spring 104 and of the clutch sleeve 101 is less than the prestressing applied to the governor sleeve 14 from the yield spring 35 mounted at the pivot support 34 of the control lever 33; and when it exceeds the prestressing of the spring 28 of the energy-storing device 32 applied to the governor sleeve 14.

Figure 9:
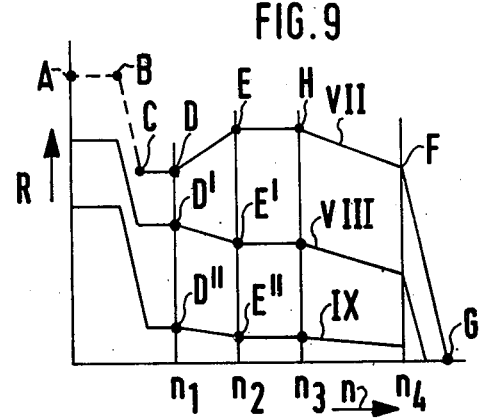
FIG. 9 is a graph of the control curves relating to a fourth embodiment.

FIG. 9 shows various control curves to be implemented by means of the centrifugal force speed governor of FIG. 8, where, similar to FIG. 7, the abscissa is the angular speed n and the ordinate the position of control rod R. The dashed line A-B-C shows the control path curve in the lower range of angular speeds, when the governor controls an excess fuel rate required for engine starting, which is then reduced to a fuel supply rate corresponding to regulation path C, for example, by idle control spring 15a. The solid line drawn between angular speeds $n_1$ and $n_4$, D-E-H-F, is denoted by VII and shows an adaptation sequence with first a negative adjustment between points D and E, then a "rest" with constant control path between E and H, and then between H and F a positive adjustment. VIII and IX represent two adaptation sequences when the setting linkage 24 is in the partial-load position, showing that the full-load controlled negative adjustment between D and E reverses into a positive one between points D' and E' and D" and E" of curves VIII and IX, respectively.

The adaptation curves denoted by VII and IX may be controlled by adaptation spring 100 alone, but in such a case the slope of the H-F segment no longer may be selected independently of that of the D-E segment. Mutually independent negative and positive adjustments may be controlled if one of the centrifugal governors 11, 11' described with respect to FIGS. 5 and 6 and provided with two adaptation springs is used in lieu of the centrifugal governor 111 described with respect to FIG. 8.

The operation of the governor of the invention according to the embodiment shown in FIGS. 1 and 5, referred to in the diagram of FIG. 7 is described below, particular emphasis being given to the adaptation system essentially consisting of control lever 33, energy-storing device 32 and yield member 34.

FIG. 1 shows all the components of the governor in the position they assume upon completion of the idle stage at an angular speed $n_1$ in FIG. 7. With the setting linkage 24 in its full-load position, the control lever 33 presses, by means of its pressure surface 38, against the pin 23 of the setting linkage.

The starting position of the control rod 21 (denoted by A in FIG. 7) will be assumed by the control rod for engine shut-off when flyweight 12 is in its rest position, as shown in FIG. 5, a space b being present in such rest position between the base 55 of flyweight 12 and the spring guide 52. The control rod 21 is then displaced further with respect to the position shown in FIG. 1 in the positive direction of the arrow VI characterizing the operative direction of the control rod, and the associated fuel injection pump delivers a starting fuel rate exceeding the full-load fuel rate, with the excess being maintained while starting the engine according to the prestressing of the idle control spring 15a as far as point B. Whereupon, the control passes to the idle control spring 15a which reduces the rate to a point denoted by C. This control rod position remains constant until an angular speed $n_1$ is reached (see point D of curve I). After traversing the idle stage (b in FIG. 5), the flyweight 12 is in the position shown in FIG. 1 and upon a further upward motion taking place against the force of the adaptation spring 83 (FIG. 5), control lever 33 in the presence of the corresponding motion of the governor sleeve 14 rotates about joint pin 34b of the pivot support 34 acting as a temporary axis of rotation. Pressure surface 38 at compression arm 33b in this process forces pin 23 in the direction of the centrifugal governor 11. The spring 28 of the energy-storing device 32 is stressed during this motion of the pin 23, and the control rod 21 is displaced by the intermediate lever 18 in a direction of an increased fuel supply rate until control rod 21 assumes its position denoted by E in FIG. 7 at an angular speed $n_2$. Presently, the adaptation control of flyweights 12 and of governor sleeve 14, as well as that of the control lever 33, is terminated with respect to the negative adjustment D-E, and control lever 33 by means of its stop dog 37 rests against the stop 36. Flyweight 12 simultaneously traverses the adaptation control path c (FIG. 5) and bottom 55 of flyweight 12 now rests against the spring guide 83. After exceeding the angular speed $n_2$, the set control rod position is kept to point K corresponding to curve IV, after which there is no longer a control motion until downward control begins. If there is only one adaptation control spring, point E is already the beginning for the positive adjustment in curve I. In the described example, the control rod position reached at point E is maintained until point H and angular speed $n_3$, a positive adaptation corresponding to curve V and segment H-F being controlled upon further increase in angular speed by adaptation spring 84. The associated adaptation control path is denoted by a in FIG. 5; spring guide 81 rests against spring guide 86 at $n_4$ and for an increase in angular speed beyond $n_4$, downward regulation to point G by means of the maximum speed control spring 15b takes place.

If the setting linkage 24 is rotated clockwise to control a smaller fuel injection rate, then the pin 23 slides further upward inside the cam slot 26 of the cam 31 and assumes a position so that later the pressure surface 38 of the control lever 33 will reach the pin 23. Thereafter the pin 23 can be displaced only a small amount in the direction of the centrifugal governor 11 towards increasing the fuel injection rate. Linkage bolt 17 of the intermediate lever 18 simultaneously carries out a motion in the same direction, both adaptation motions are lifting motions and are denoted in the adaptation curve of FIG. 7 by II, with the control rod 21 remaining in the position D' until reaching point E'. The control lever 33 rests against the stop 36 at angular speed $n_2$, and it exerts no further control motion on the pin 23 when the governor sleeve 14 is displaced further upon an increase in angular speed. Curves II and III are shown for a governor controlling a full-load adaptation corresponding to curve I. As regards the modification of the invention for the negative adjustment between points D and E, or D' and E' and D" and E", there is no significance in the behavior of the adaptation curve above angular speed $n_2$, and this behavior may be arbitrary.

If setting linkage 24 is still further rotated in the clockwise direction, the pin 23 (FIG. 1) assumes a position still further removed from the governor sleeve 14, and it will fail to engage the control lever 33 at all upon displacements of governor sleeve 14, so that intermediate lever 18 pivots about the fixed pin 23 during the adaptation control path c (FIG. 5) and controls a positive adaptation between points D" and E", with the positive adjustment being followed above $n_2$ by a further positive adaptation, if appropriate after a rest between $n_2$ and $n_3$, controlled by the second adaptation spring 84.

The same control curves comprising a negative and a positive adjustment curve may be controlled by the centrifugal force speed governor also by means of the flyweight control 11' of FIG. 6; the governors of the embodiments of FIGS. 3 and 4 also are capable of controlling the many variations of adaptation of the fuel injection rate shown in FIG. 7.

The mode of operation of the fourth embodiment shown in FIG. 8 will be described with reference to FIG. 9, this operation being different from that of the embodiment of FIG. 1. After passing through the idle stage b and withdrawing control rod 21 from the starting position A (FIG. 9), flyweight 12 is at its position shown in FIG. 8, see point D at $n_1$ in curve VII, FIG. 9. Upon further upward motion against the force from the adaptation spring 100, the control lever 33, upon a corresponding motion of the governor sleeve 14, rotates about joint pin 34b of the pivot support 34 acting as a temporary fixed axis of rotation. The pressure surface 38 at compression arm 33b thereby forces the pin 23 in the direction of the centrifugal governor 111. The spring 28 of the energy-storing device 32 is stressed during this motion of the pin 23 and the control rod 21 is displaced in the direction of a large fuel injection supply rate until control rod 21 has assumed the position denoted by E in FIG. 9 at angular speed $n_2$. The spring 28 is overcome because, as already stated, the prestressing of the yield spring 104 exceeds that of the spring 28. This is the termination of the adaptation control motion of the flyweights 12 and of the governor sleeve 14. This is also the termination of control lever 33 controlling the negative adjustment D-E, and control lever 33 rests against stop 36 by means of its stop dog 37. During this time, flyweights 12 simultaneously pass through partial control path e. Upon exceeding angular speed $n_2$, the control rod position reached at point E is maintained until point H and angular speed $n_3$, while clutch sleeve 101 maintains its position along partial control path j, yield spring 104 and spacing h between clutch sleeve 101 and stop component 105 allowing a corresponding idle stroke of control sleeve 14.

Upon further increase in angular speed above $n_3$, a positive adjustment is controlled to correspond to segment H-F of the same adaptation spring 100 and while yield spring 35 yields. The associate partial control path of the flyweight 12 is denoted by g in FIG. 8. At $n_4$, spring guide 52 rests against spring guide 53, downward control to point G takes place beyond $n_4$ by means of the maximum speed control spring 15b.

If the setting linkage 24 is rotated clockwise for the purpose of a smaller fuel injection rate, the pin 23 will move further upward within the cam slot 26 of the cam 31 and assumes a position for which pressure surface 38 of the control lever 33 no longer reaches the pin 23, whereby the latter no longer can be displaced toward centrifugal governor 11 for the purpose of increasing the fuel injection rate.

Along the adaptation control path e (FIG. 8) and between angular speeds $n_1$ and $n_2$ the intermediate lever 18 therefore pivots about a fixed pin 23 and a positive adjustment already is being controlled between points D' and E' in curve VIII or between D" and E" in curve IX, which are followed, as is the case for curve VII, by a "rest" up to angular speed $n_3$ and a further positive adjustment between $n_3$ and $n_4$.

Yield member 34, 34' or 75 is activated in all the described embodiments after control element 33, 33' or 71 rest against the housing fastened stop 36 or 76, at the same time the governor sleeve, for controlling the positive adjustment or for the downward regulation of the rate of fuel injection, is moving.

The described characteristics of the invention allow converting extant centrifugal force speed governors, in particular idle and maximum speed governors, in a simple manner into a governor controlling a negative, or a negative and positive adjustment, and a negative and positive adjustment with an intermediate, uncontrolled range (rest). Control element 33 is so designed, employing simple means, that the negative adjustment is ineffective at partial loads and is converted into a positive one, whereby excessive power loss is prevented in partial load operation in the lower range of angular speeds, and the engine provided with favorable torque as a function of time.

The foregoing relates to preferred exemplary embodiments of the invention, it being understood that other embodiments and variants thereof are possible within the spirit and scope of the invention, the latter being defined by the appended claims.

What is claimed is:

1. A centrifugal force speed governor, and in particular idle and maximum speed governors, for fuel injected internal combustion engines, comprising:
    (a) an adjustment member coupled to an assembly including speed responsive means and at least one adaptation spring, for producing displacement of the adjustment member as a function of speed;
    (b) an intermediate lever coupled to the adjustment member, a fuel supply rate adjustment member of a fuel injection pump coupled to said intermediate lever;
    (c) a pivot support;
    (d) a control element mounted to the pivot support and coupled to the adjustment member;
    (e) a stop supported on the governor for limiting the movement of said control element;
    (f) energy storing means for yieldingly biasing the movement of said intermediate lever in one direction; and
    (g) a setting linkage to which a pin is mounted for engaging the intermediate lever, the control element and the energy storing means; wherein
        (i) the displacement of the adjustment member due to the speed responsive means, when regulated by said at least one adaptation spring, produces a negative adjustment of the fuel supply rate adjustment member opposite the sense of regulation, i.e., in a direction of increasing fuel supply as the angular speed of the governor increases;
        (ii) said negative adjustment being effected, at least for the full-load position of the setting linkage, by the adjustment member in moving the control element which in turn moves the setting linkage pin stressing the energy storing means and moving the intermediate lever; and
        (iii) the stop limits the movement of the setting linkage pin due to the engagement of the control element with said stop, while the pivot support allows further control motions of the adjustment member.

2. The centrifugal force speed governor as defined in claim 1, wherein the control element includes a pressure surface which engages with the setting linkage pin, the pressure surface being of a shape and located on the control element such that for the full-load position of the setting linkage it engages the setting linkage pin for the purpose of controlling the negative adjustment, for the idle position of the setting linkage it does not modify the position of the setting linkage pin, and for the partial-load position of the setting linkage it affects the setting linkage pin displacement to a limited extent, if at all.

3. The centrifugal force speed governor as defined in claim 1, wherein the pivot support includes means for applying a force to the setting linkage pin through the control element, wherein the energy storing means includes a spring and a setting linkage pin connecting means connected to the spring for transferring the spring force to the setting linkage pin tending to retain said pin in its position which it occupies prior to the negative adjustment and controlling a lower fuel injection rate, and wherein the force applied to said pin by the spring is less than the force applied to said pin by the pivot support force applying means.

4. The centrifugal force speed governor as defined in claim 1, further comprising: a housing, wherein the stop is adjustably mounted to the housing and may be locked in its position with respect to the housing, and wherein in its locked position the stop is so mounted as to prevent further motion of the setting linkage pin for the unchanged position of the setting linkage following the displacements associated with the negative adjustment.

5. The centrifugal force speed governor as defined in claim 1, further comprising: a housing, wherein the control element is pivotally mounted to the pivot support and wherein the pivot support is elastically mounted to the housing.

6. The centrifugal force speed governor as defined in claim 5, wherein the pivot support is mounted to the housing in parallel relationship to the adjusting member and includes a pivot spring permitting displacement of the yield support against the force of the yield spring in the same direction as the adjustment member.

7. The centrifugal force speed governor as defined in claim 5, wherein the control element is mounted at one end to the pivot support and is provided with a compression arm at its other end on which a pressure surface is defined, the pressure surface being of a shape and located on the control element such that for the full-load position of the setting linkage it engages the setting linkage pin for the purpose of controlling the negative adjustment, for the idle position of the setting linkage it does not modify the position of the setting linkage pin, and for the partial-load position of the setting linkage it affects the setting linkage pin displacement to a limited extent, if at all.

8. The centrifugal force speed governor as defined in claim 5, wherein the control element is mounted at one end to the pivot support and defines at its other end a stop dog which engages the stop, said stop serving as a subsequent pivot point for the control element when the stop dog is in engagement therewith and the adjustment member executes its further control motions due to the elastically mounted pivot support.

9. The centrifugal force speed governor as defined in claim 8, wherein the control element includes a pressure surface which engages with the setting linkage pin, the pressure surface being of a shape and located on the control element such that in the full-load position of the setting linkage, in the presence of the further control motions of the adjustment member and in the presence of rotation of the control element about said stop when the stop dog engages said stop, the control element engages the setting linkage pin for the purpose of controlling the negative adjustment.

10. The centrifugal force speed governor as defined in claim 5, wherein the control element is configured as a yield member, and wherein the control yield member includes a stop dog at one end which engages the stop, said stop serving as a subsequent pivot point for the control yield member when the stop dog is in engagement therewith and the adjustment member executes its further control motions due to the elasticity of the control yield member.

11. The centrifugal force speed governor as defined in claim 10, wherein the control element includes a pressure surface which engages with the setting linkage pin, the pressure surface being of a shape and located on the control element such that in the full-load position of the setting linkage, in the presence of the further control motions of the adjustment member and in the presence of rotation of the control element about said stop when the stop dog engages said stop, the control element engages the setting linkage pin for the purpose of controlling the negative adjustment.

12. The centrifugal force speed governor as defined in claim 1, further comprising: a housing, wherein the control element is pivotally mounted on a bolt connected with the adjustment member, wherein the control element includes a compression arm at one end and a longitudinal slot in its other end through which it is linked by a joint pin to the pivot support, wherein the pivot support is elastically mounted to the housing, and wherein the spacing between the pivot support and the bolt may be modified and locked in the modified position.

13. The centrifugal force speed governor as defined in claim 1, further comprising: a housing; a second yield member; and a yield spring, wherein the control element is pivotally mounted to the pivot support, serving as a first yield member, wherein the first yield member is elastically mounted to the housing, wherein the intermediate lever is connected to the adjustment member by means of the second yield member against the force of the yield spring, and wherein said second yield member couples the control element and the adjustment member and is displaceable by a predetermined amount (h).

14. The centrifugal force speed governor as defined in claim 13, wherein the pivot support includes a yield spring and the energy storing means includes a spring, wherein the prestressing of the yield spring of the second yield member is less than that of the pivot spring of the yield support but higher than that of the spring of the energy storing means.

15. The centrifugal force speed governor as defined in claim 13, further comprising: a stop component, wherein the second yield member is supported on the adjustment member as a clutch sleeve, and wherein the displacement (h) is determined by the stop component.

16. The centrifugal force speed governor as defined in claim 1, further comprising: a housing; and a slide member mounted to and guided within the housing in the axial direction of the adjustment member, wherein the energy storing means includes a spring and together with the slide member serves as the control element, and wherein the slide member is provided with a pressure surface which engages the setting linkage pin during appropriate positioning of the setting linkage and the adjustment member.

17. The centrifugal force speed governor as defined in claim 16, wherein the adjustment member includes a shoulder and the slide member includes a part engageable with the shoulder due to the spring of the energy storing means.

18. The centrifugal force speed governor as defined in claim 1, wherein the speed responsive means includes flyweights and a control spring mounted in each flyweight and acting thereon, and wherein the adaptation spring acts outside of the flyweights and on the adjustment member to control the negative adjustment.

19. The centrifugal force speed governor as defined in claim 18, further comprising: two spring rests; and stop means, wherein the adaptation spring is clamped in place coaxially with and on the adjustment member between the spring rests, and wherein one of the spring rests, upon traversing an idle path (d) comes to rest against said stop means.

20. The centrifugal force speed governor as defined in claim 1, wherein the adaptation spring, upon traversing a control path (c,e) of the adjustment member controlling the negative adjustment, controls, through the pin, the setting linkage and the stop, a further adaptation path regulating positive adjustment.

21. The centrifugal force speed governor as defined in claim 1, further comprising: at least one second adaptation spring, wherein the speed responsive means includes flyweights, and wherein the at least one second adaptation spring opposes the centrifugal forces of said flyweights and contols a positive adjustment.

22. The centrifugal force speed governor as defined in claim 21, further comprising: spring guides, wherein the speed responsive means includes flyweights and control springs, wherein the adaptation and control springs are mounted within the flyweights and rest against said spring guides, and wherein both adaptation springs can be loaded by a flyweight through their spring guide, which are secured in position with respect to the flyweight, and wherein the spring guides for each adaptation spring are mouned coaxially with respect to each other in the flyweight.

23. The centrifugal force speed governor as defined in claim 21, further comprising: a plurality of spring guides; and control springs for each flyweight, wherein the control and adaptation springs are mounted within the flyweights, each resting against a spring guide, and wherein both adaptation springs are mounted each in a different flyweight.

24. The centrifugal force speed governor as defined in claim 23, wherein the flyweights housing both adaptation springs are linked to a common linkage point of the adjustment member.

25. The centrifugal force speed governor as defined in claim 21, further comprising: a plurality of spring guides; and control springs for each flyweight, wherein the control and adaptation springs are mounted within the flyweights, each resting against a spring guide, and wherein said adaptation springs are mounted in a pair of flyweights.

26. The centrifugal force speed governor as defined in claim 25, wherein the flyweights housing both adaptation springs are linked to a common linkage point of the adjustment member.

* * * * *